United States Patent
Gorin et al.

(10) Patent No.: US 12,227,141 B2
(45) Date of Patent: Feb. 18, 2025

(54) COATING COMPOSITION, A COATED FABRIC, A METHOD OF MAKING A COATED FABRIC, AND AN ARTICLE MADE FROM THE COATED FABRIC

(71) Applicants: Dow Global Technologies LLC, Midland, MI (US); Dow Silicones Corporation, Midland, MI (US)

(72) Inventors: Craig Gorin, Midland, MI (US); Manesh Sekharan, Freeport, TX (US); David Yancey, Midland, MI (US); David Bank, Midland, MI (US); Jacob Milne, Hemlock, MI (US); Mark Fisher, Midland, MI (US); Rebecca Beeson, Midland, MI (US)

(73) Assignees: Dow Global Technologies LLC, Midland, MI (US); Dow Silicone Corporation, Midland, MI (US)

( * ) Notice: Subject to any disclaimer, the term of this patent is extended or adjusted under 35 U.S.C. 154(b) by 828 days.

(21) Appl. No.: 17/281,272

(22) PCT Filed: Oct. 8, 2019

(86) PCT No.: PCT/US2019/055080
§ 371 (c)(1),
(2) Date: Mar. 30, 2021

(87) PCT Pub. No.: WO2020/081280
PCT Pub. Date: Apr. 23, 2020

(65) Prior Publication Data
US 2022/0001829 A1    Jan. 6, 2022

(51) Int. Cl.
*B60R 21/235* (2006.01)
*B82Y 30/00* (2011.01)
(Continued)

(52) U.S. Cl.
CPC .......... *B60R 21/235* (2013.01); *C08G 77/16* (2013.01); *C08G 77/18* (2013.01);
(Continued)

(58) Field of Classification Search
CPC ..... C09D 5/024; C08L 23/0815; C08L 31/04; C08L 33/08; C08L 51/003; C08L 75/04; C08G 77/16; C08G 77/18; D06M 13/5135
See application file for complete search history.

(56) References Cited

U.S. PATENT DOCUMENTS

| 648,929 A | 5/1900 | Clowes |
| 3,645,992 A | 2/1972 | Elston |

(Continued)

FOREIGN PATENT DOCUMENTS

| CN | 1798889 A | 7/2006 |
| CN | 1937967 A | 3/2007 |

(Continued)

OTHER PUBLICATIONS

Chinese Office action received May 3, 2023; from counterpart Chinese Application No. 201980060182.2.

*Primary Examiner* — Lynda Salvatore
(74) *Attorney, Agent, or Firm* — Warner Norcross + Judd LLP

(57) ABSTRACT

A coating composition which comprises a first polymeric component which comprises a first polymeric dispersion, wherein polymers contained in the first polymeric dispersion have a surface free energy of equal to or greater than 28 mJ/m² and a volume average particle size diameter of from 0.1 to 10 microns; a second polymeric component which comprises one or more second polymeric emulsions wherein polymers contained in the second polymeric emulsions have a surface free energy equal to or less than 26 mJ/m² and a
(Continued)

volume average particle size diameter from 0.005 to 1,000 microns; one or more rheology modifiers is provided. An article coated with the coating composition and a method of making the coated article are also provided.

8 Claims, 1 Drawing Sheet

(51) Int. Cl.
    *C08G 77/16* (2006.01)
    *C08G 77/18* (2006.01)
    *D06M 13/513* (2006.01)

(52) U.S. Cl.
    CPC ............... *D06M 13/5135* (2013.01); *B60R 2021/23514* (2013.01); *B60R 2021/23533* (2013.01); *B82Y 30/00* (2013.01)

(56) References Cited

U.S. PATENT DOCUMENTS

| | | | |
|---|---|---|---|
| 3,686,359 A | 8/1972 | Soldatos et al. |
| 4,066,628 A | 1/1978 | Ashida et al. |
| 4,076,698 A | 2/1978 | Anderson et al. |
| 4,438,254 A | 3/1984 | Doorakian et al. |
| 4,480,082 A | 10/1984 | McLean et al. |
| 4,599,392 A | 7/1986 | McKinney et al. |
| 4,988,781 A | 1/1991 | McKinney et al. |
| 5,089,588 A | 2/1992 | White et al. |
| 5,110,666 A | 5/1992 | Menzel et al. |
| 5,115,075 A | 5/1992 | Brennan et al. |
| 5,171,820 A | 12/1992 | Mang et al. |
| 5,246,751 A | 9/1993 | White et al. |
| 5,272,236 A | 12/1993 | Lai et al. |
| 5,278,272 A | 1/1994 | Lai et al. |
| 5,504,172 A | 4/1996 | Imuta et al. |
| 5,539,021 A | 7/1996 | Pate et al. |
| 5,574,091 A | 11/1996 | Walther et al. |
| 5,756,659 A | 5/1998 | Hughes et al. |
| 5,798,410 A | 8/1998 | Walther et al. |
| 5,938,437 A | 8/1999 | De Vincenzo |
| 6,239,046 B1 | 5/2001 | Veiga et al. |
| 6,348,543 B1 | 2/2002 | Parker |
| 6,455,636 B2 | 9/2002 | Sanada |
| 6,525,157 B2 | 2/2003 | Cozewith et al. |
| 6,545,092 B2 | 4/2003 | Parker |
| 6,641,696 B1 | 11/2003 | Edgerton |
| 6,713,131 B2 | 3/2004 | Blackwood et al. |
| 6,825,263 B2 | 11/2004 | Lin et al. |
| 6,846,004 B2 | 1/2005 | Parker |
| 6,960,635 B2 | 11/2005 | Stevens et al. |
| 7,132,170 B2 | 11/2006 | Parker |
| 7,501,359 B2 | 3/2009 | Li |
| 7,543,843 B2 | 6/2009 | Keshavaraj et al. |
| 7,608,668 B2 | 10/2009 | Li Pi Shan et al. |
| 7,736,702 B1 | 6/2010 | Keshavaraj |
| 7,763,676 B2 | 7/2010 | Moncla et al. |
| 7,935,755 B2 | 5/2011 | Moncla et al. |
| 8,007,630 B1 | 8/2011 | Keshavaraj et al. |
| 8,318,257 B2 | 11/2012 | Neubauer et al. |
| 9,222,611 B2 | 12/2015 | Colasanto |
| 2006/0199930 A1 | 9/2006 | Li Pi Shan et al. |
| 2006/0217016 A1 | 9/2006 | Lin et al. |
| 2009/0139012 A1* | 6/2009 | Hassan ............... C08J 7/046 2/167 |
| 2009/0298367 A1 | 12/2009 | Lafaysse et al. |
| 2012/0280479 A1 | 11/2012 | Barth et al. |
| 2013/0121949 A1 | 5/2013 | Bekemeier et al. |
| 2013/0122204 A1 | 5/2013 | Evans et al. |
| 2013/0143989 A1 | 6/2013 | Kojima et al. |
| 2013/0338239 A1 | 12/2013 | Bekemeier et al. |
| 2014/0141268 A1 | 5/2014 | Wilbur et al. |
| 2014/0308229 A1 | 10/2014 | Bouzeloc et al. |
| 2014/0371317 A1 | 12/2014 | Aliyar et al. |
| 2016/0013748 A1 | 1/2016 | Mori |
| 2017/0000722 A1 | 1/2017 | Feng et al. |

FOREIGN PATENT DOCUMENTS

| | | |
|---|---|---|
| CN | 105026504 A | 11/2015 |
| CN | 105713271 A | 6/2016 |
| CN | 108504283 | 9/2018 |
| CN | 108504283 A | 9/2018 |
| EP | 1742786 | 1/2007 |
| JP | 04357702 B2 | 11/2009 |
| JP | 04785037 B2 | 10/2011 |
| WO | 2000001745 | 1/2000 |
| WO | 2001012894 | 2/2001 |
| WO | 2008057878 A3 | 7/2008 |
| WO | 2011060238 | 5/2011 |
| WO | 2016160228 | 10/2016 |

* cited by examiner

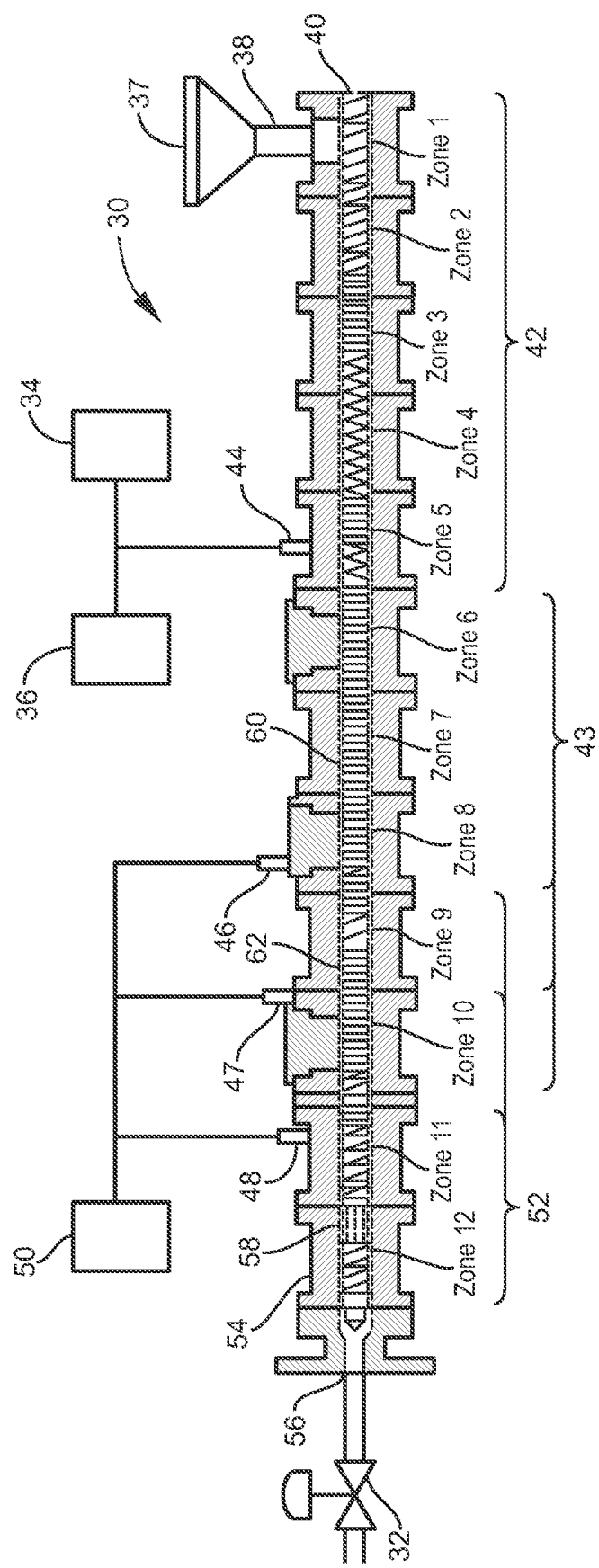

COATING COMPOSITION, A COATED FABRIC, A METHOD OF MAKING A COATED FABRIC, AND AN ARTICLE MADE FROM THE COATED FABRIC

CROSS-REFERENCE TO RELATED APPLICATIONS

This application is a 371 Application which claims the benefit of PCT/US2019/055080, filed Oct. 8, 2019, which claimed the benefit of U.S. Provisional Application No. 62/746,577, filed Oct. 17, 2018, both of which are hereby incorporated herein by reference in their entirety.

FIELD OF INVENTION

The instant invention relates to a coating composition, a coated fabric, a method of making a coated fabric, and an article made from the coated fabric.

BACKGROUND OF THE INVENTION

Polymer coatings on fabric, primarily polyester and nylon, are used for gas/air pressure retention applications, such as in automotive airbags and aircraft emergency chutes. Silicone coatings are predominant in the market, although organic coatings coating have entered the market due to lower cost. Issues exist with the known coatings including cost, blocking (the tendency of polymer coated surfaces to stick to each other), flammability, high coat weight, and loss of gas pressure over periods greater than a few seconds. Pressure retention coatings optimizing all of these factors would be useful in such applications.

SUMMARY OF THE INVENTION

The instant invention provides a coating composition, a coated fabric, a method of making a coated fabric, and an article made from the coated fabric. The invention further provides articles, such as air bags and emergency chutes, made from the coated fabric.

In one embodiment, the present invention provides a coating composition comprising: (1) a first polymeric component which comprises a first polymeric dispersion, wherein polymers contained in the first polymeric dispersion have a surface free energy of equal to or greater than 28 $mJ/m^2$ and a volume average particle size diameter of from 0.1 to 10 microns; (2) a second polymeric component which comprises one or more second polymeric emulsions wherein polymers contained in the second polymeric emulsions have a surface free energy equal to or less than 26 $mJ/m^2$ and a volume average particle size diameter from 0.005 to 1,000 microns; (3) a sufficient amount of one or more rheology modifiers such that the coating composition has a viscosity of from 100 to 2000 cPs; and (4) optionally, sufficient base such that the first and second polymeric components remain stable; wherein the first polymeric component is present in an amount such that the solids in the first polymeric component are from 50 to 99.9 wt % of a total solids content of the coating composition; and wherein the second polymeric component is present in an amount such that the solids in the second polymeric component are from 0.1 to 50 wt % of a total solids content of the coating composition.

In an alternative embodiment, the present invention provides a coated fabric for use in airbags, comprising: (1) a woven or nonwoven substrate; (2) a coating derived from the inventive coating composition, wherein the coating is applied to at least one surface of the substrate at a total coating weight of from 20 to 50 $g/m^2$.

In another alternative embodiment, the present invention provides an article comprising the inventive coated fabric.

In another alternative, the present invention provides a method of preparing a coated fabric comprising: providing a woven or nonwoven substrate; applying a coating composition to at least one surface of the substrate by one or more application method selected from the group consisting of knife coating, roll coating, dip coating, flow coating, squeeze coating, and spray coating to produce a wet coated substrate; and drying the wet coated substrate to produce a coated fabric exhibiting a coating weight of 20 to 50 $g/m^2$.

BRIEF DESCRIPTION OF THE DRAWINGS

FIG. 1 is a schematic representation of a typical melt-extrusion apparatus used to prepare the dispersions used in embodiments of the invention.

DETAILED DESCRIPTION OF THE INVENTION

The instant invention provides a coating composition, a coated fabric and articles made therefrom, and a method of making a coated fabric.

Coating Composition

The coating composition according to the present invention comprises (a) a first polymeric component, (b) a second polymeric component; (c) a rheology modifier, (d) optionally, a base, and (e) optionally, a solvent.

First Polymeric Component

The first polymeric component comprises a first polymeric dispersion, wherein polymers contained in the first polymeric dispersion have a surface free energy of equal to or greater than 28 $mJ/m^2$ and a volume average particle size diameter of from 0.1 to 10 microns. As used herein, the term "first polymeric dispersion" encompasses polymers dispersed in a liquid which are generally known as dispersions, as well as polymeric emulsions, such as acrylic latexes, and polymeric suspensions. All individual values and subranges from equal to or greater than 28 $mJ/m^2$ are included and disclosed herein; for example, the surface free energy of the polymers in the first polymeric dispersion may range from a lower limit of 28, 30, 32, or 34 $mJ/m^2$. For example, the surface free energy of the polymers in the first polymeric dispersion may range from 28 to 60 $mJ/m^2$, or in the alternative, from 28 to 42 $mJ/m^2$, or in the alternative, from 30 to 50 $mJ/m^2$, or in the alternative, from 35 to 55 $mJ/m^2$. All individual values and subranges from 0.1 to 10 microns are included and disclosed herein; for example, the volume average particle size diameter of the solids in the first polymeric dispersion may range from a lower limit of 0.1, 0.5, 1, 3, or 5 microns to an upper limit of 1, 5, 7, 9 or 10 microns. For example, the volume average particle size diameter of the solids in the first polymeric dispersion may range from 0.1 to microns, or in the alternative, from 0.1 to 5 microns, or in the alternative, from 0.5 to 6 microns, or in the alternative, from 1 to 8 microns.

The polymers contained in the first polymeric dispersion may include, by way of example and not limitation, nylons and aramids (generally having a surface free energy of from about 40 to 67 $mJ/m^2$), epoxies (generally having a surface free energy of about 45 $mJ/m^2$), cellulosics (generally having a surface free energy of from about 30 to 40 $mJ/m^2$), acrylates (generally having a surface free energy of from about 28 to 60 $mJ/m^2$), polyolefins (generally having a surface free energy of from about 30 to 34 mJ/m²), polystyrenes (generally having a surface free energy of about 38 mJ/m²) and polyurethanes (generally having a surface free energy of about 37 mJ/m²).

In certain embodiments, one or more polymers in the first polymeric dispersion may, for example, comprise a polyester. Polyester refers to thermoplastic resins that may include polymers containing at least one ester bond. For example, polyester polyols may be prepared via a conventional esterification process using a molar excess of an aliphatic diol or glycol with relation to an alkanedioic acid. Illustrative of the glycols that can be employed to prepare the polyesters are ethylene glycol, diethylene glycol, propylene glycol, dipropylene glycol, 1,3-propanediol, 1,4-butanediol and other butanediols, 1,5-pentanediol and other pentane diols, hexanediols, decanediols, and dodecanediols. In some embodiments, the aliphatic glycol may contain from 2 to about 8 carbon atoms. Illustrative of the dioic acids that may be used to prepare the polyesters are maleic acid, malonic acid, succinic acid, glutaric acid, adipic acid, 2-methyl-1,6-hexanoic acid, pimelic acid, suberic acid, and dodecanedioic acids. In some embodiments, the alkanedioic acids may contain from 4 to 12 carbon atoms. Illustrative of the polyester polyols are poly(hexanediol adipate), poly(butylene glycol adipate), poly(ethylene glycol adipate), poly(diethylene glycol adipate), poly(hexanediol oxalate), and poly(ethylene glycol sebecate). Other embodiments of the present invention use polyester resins containing aliphatic diols such as UNOXOL (a mixture of cis and trans 1,3- and 1,4-cyclohexanedimethanol) available from The Dow Chemical Company (Midland, MI).

In certain embodiments, one or more polymers in the first polymeric dispersion may, for example, comprise a thermoset material comprising an epoxy resin. Epoxy resin refers to a composition which possesses one or more vicinal epoxy groups per molecule, i.e. at least one 1,2-epoxy group per molecule. In general, such compound is a saturated or unsaturated aliphatic, cycloaliphatic, aromatic or heterocyclic compound which possesses at least one 1,2-epoxy group. Such compound can be substituted, if desired, with one or more non-interfering substituents, such as halogen atoms, hydroxy groups, ether radicals, lower alkyls and the like.

Illustrative epoxies are described in the *Handbook of Epoxy Resins* by H. E. Lee and K. Neville published in 1967 by McGraw-Hill, New York and U.S. Pat. No. 4,066,628, incorporated herein by reference.

Particularly useful compounds which can be used in the practice of the present invention are epoxy resins having the following formula:

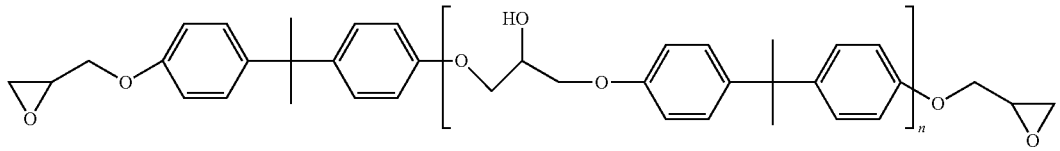

wherein n has an average value of 0 or more.

The epoxy resins useful in the present invention may include, for example, the glycidyl polyethers of polyhydric phenols and polyhydric alcohols. As an illustration of the present invention, examples of known epoxy resins that may be used in the present invention, include for example, the diglycidyl ethers of resorcinol, catechol, hydroquinone, bis-phenol, bisphenol A, bisphenol AP (1,1-bis(4-hydroxylphenyl)-1-phenyl ethane), bisphenol F, bisphenol K, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins tetramethylbiphenol, tetramethyl-tetrabromobiphenol, tetramethyltribromobiphenol, tetrachlorobisphenol A and any combination thereof.

Examples of diepoxides particularly useful in the present invention include diglycidyl ether of 2,2-bis(4-hydroxyphenyl) propane (generally referred to as bisphenol A) and diglycidyl ether of 2,2-bis(3,5-dibromo-4-hydroxyphenyl) propane (generally referred to as tetrabromobisphenol A). Mixtures of any two or more polyepoxides can also be used in the practice of the present invention.

Other exemplary diepoxides include the diglycidyl ethers of dihydric phenols, such as those described in U.S. Pat. Nos. 5,246,751; 5,115,075; 5,089,588; 4,480,082 and 4,438,254, all of which are incorporated herein by reference, or the diglycidyl esters of dicarboxylic acids such as those described in U.S. Pat. No. 5,171,820. Other exemplary diepoxides include for example, αω-diglycidyloxyisopropylidene-bisphenol-based epoxy resins (commercially known as D.E.R.® 300 and 600 series epoxy resins, products of The Dow Chemical Company, Midland, Michigan).

The epoxy resins which can be employed in the practice of the present invention also include epoxy resins prepared either by reaction of diglycidyl ethers of dihydric phenols with dihydric phenols or by reaction of dihydric phenols with epichlorohydrin (also known as "taffy resins").

Exemplary epoxy resins include, for example, the diglycidyl ethers of bisphenol A; 4,4'-sulfonyldiphenol; 4,4-oxydiphenol; 4,4'-dihydroxybenzophenone; resorcinol; hydroquinone; 9,9'-bis(4-hydroxyphenyl)fluorene; 4,4'-dihydroxybiphenyl or 4,4'-dihydroxy-α-methylstilbene and the diglycidyl esters of the dicarboxylic acids.

Other useful epoxide compounds include cycloaliphatic epoxides. A cycloaliphatic epoxide consists of a saturated carbon ring having an epoxy oxygen bonded to two vicinal atoms in the carbon ring for example as illustrated by the following general formula:

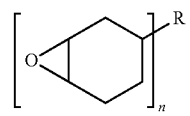

wherein R is a hydrocarbon group optionally comprising one or more heteroatoms (such as, without limitation thereto Cl, Br, and S), or an atom or group of atoms forming a stable bond with carbon (such as, without limitation thereto, Si, P and B) and wherein n is greater than or equal to 1.

The cycloaliphatic epoxide may be a monoepoxide, a diepoxide, a polyepoxide, or a mixture of those. For example, any of the cycloaliphatic epoxide described in U.S. Pat. No. 3,686,359, incorporated herein by reference, may be used in the present invention. As an illustration, the cycloaliphatic epoxides that may be used in the present invention include, for example, (3,4-epoxycyclohexyl-methyl)-3,4-epoxy-cyclohexane carboxylate, bis-(3,4-epoxycyclohexyl) adipate, vinylcyclohexene monoxide and mixtures thereof.

In certain embodiments, one or more polymers in the first polymeric dispersion may comprise a thermoplastic polyurethane polymer. Such thermoplastic polyurethane polymers are generally known, and further described, for example, in the International Publication No. 2008/057878, incorporated herein by reference to the extent that it describes a thermoplastic polyurethane polymer. Exemplary polyurethanes include PELLETHANE thermoplastic polyurethane elastomers available from Lubrizol Advanced Materials, Inc. ESTANE thermoplastic polyurethanes, TECOFLEX thermoplastic polyurethanes, CARBOTHANE thermoplastic polyurethanes, TECOPHILIC thermoplastic polyurethanes, TECOPLAST thermoplastic polyurethanes, and TECOTHANE thermoplastic polyurethanes, all available from Noveon; ELASTOLLAN thermoplastic polyurethanes and other thermoplastic polyurethanes available from BASF; and commercial thermoplastic polyurethanes available from Bayer, Huntsman and Merquinsa.

In yet another embodiment, the first polymeric dispersion may contain one or more emulsion polymer latexes comprising one or more acrylate or methacrylate polymers ("(meth)acrylates"). Examples of suitable (meth)acrylates include methyl acrylate, ethyl acrylate, butyl acrylate, hexyl acrylate, 2-ethylhexyl acrylate, octyl acrylate and isooctyl acrylate, n-decyl acrylate, isodecyl acrylate, tert-butyl acrylate, methyl methacrylate, butyl methacrylate, hexyl methacrylate, isobutyl methacrylate, isopropyl methacrylate as well as 2-hydroxyethyl acrylate and acrylamide. The preferred (meth)acrylates are methyl acrylate, ethyl acrylate, butyl acrylate, 2-ethylhexyl acrylate, octyl acrylate, isooctyl acrylate, methyl methacrylate and butyl methacrylate. Other suitable monomers include lower alkyl acrylates and methacrylates including acrylic and methacrylic ester monomers: methyl acrylate, ethyl acrylate, n-butyl acrylate, t-butyl acrylate, 2-ethylhexyl acrylate, decyl acrylate, isobornyl acrylate, methyl methacrylate, ethyl methacrylate, n-propyl methacrylate, isopropyl methacrylate, n-butyl methacrylate, isobutyl methacrylate, sec-butyl methacrylate, cyclohexyl methacrylate, isodecyl methacrylate, isobornyl methacrylate, t-butylaminoethyl methacrylate, stearyl methacrylate, glycidyl methacrylate, dicyclopentenyl methacrylate, phenyl methacrylate.

In one embodiment, the first polymeric dispersion comprises the melt blended product of: (a) from 50 to 98 wt %, based on the total solids weight of the dispersion, of one or more olefinic base polymers, wherein the one or more olefinic base polymers exhibit a surface free energy of equal to or greater than 28 mJ/m$^2$; (b) from 2 to 40 wt %, based on the total solids weight of the dispersion, of one or more dispersants; (c) from 0 to 15 wt %, based on the total solids weight of the dispersion, of one or more compatibilizers; (d) water; and (e) optionally, sufficient neutralizing agent to neutralize the one or more dispersants from 100 to 140% of an acid value of the one or more dispersants; wherein the dispersion exhibits a volume mean particle size of equal to or less than 1 micron, and a solids content of from 1 to 60 wt %.

The first polymeric dispersion comprises from 50 to 98 percent by weight of base polymer(s), based on the total weight of the solid content of the dispersion. All individual values and subranges from 50 to 98 weight percent are included herein and disclosed herein; for example, the weight percent can be from a lower limit of 50, 55, 60, 65, 70, 75, 80, 82, 90, or 92 weight percent to an upper limit of 65, 74, 83, 87, 90, 95, or 98 weight percent. For example, the dispersion may comprise from 50 to 98, or in the alternative from 75 to 95, or in the alternative from 60 to 85 percent by weight of base polymer(s), based on the total weight of the solid content of the dispersion. The dispersion comprises at least one or more olefinic base polymers. The olefinic base polymer may, for example, be selected from the group consisting of a thermoplastic material, and a thermoset material. The one or more base polymers comprise one or more olefin-based polymers.

Examples of thermoplastic materials include, but are not limited to, homopolymers and copolymers (including elastomers) of an alpha-olefins such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene, as typically represented by ethylene-butadiene copolymer and ethylene-ethylidene norbornene copolymer; and polyolefins (including elastomers) such as copolymers of two or more alpha-olefins with a conjugated or non-conjugated diene, as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer.

In selected embodiments, the olefinic base polymer comprises a polyolefin selected from the group consisting of ethylene-alpha olefin copolymers, and propylene-alpha olefin copolymers. In particular, in select embodiments, the base polymer comprises one or more non-polar polyolefins.

In some embodiments, preferred olefinic polymers include homogeneous polymers, as described in U.S. Pat. No. 3,645,992; high density polyethylene (HDPE), as described in U.S. Pat. No. 4,076,698; heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers, which can be prepared, for example, by processes disclosed in U.S. Pat. Nos. 5,272,236 and 5,278,272, the disclosures of which are incorporated herein by reference; and high pressure, free radical polymerized ethylene polymers and copolymers such as low density polyethylene (LDPE).

In one embodiment, the polymer in the first polymeric dispersion is a propylene-based copolymer or interpolymer. In some particular embodiments, the propylene/ethylene copolymer or interpolymer is characterized as having substantially isotactic propylene sequences. The term "substantially isotactic propylene sequences" and similar terms mean that the sequences have an isotactic triad (mm) measured by 13C NMR of greater than about 0.85, preferably greater than about 0.90, more preferably greater than about 0.92 and most preferably greater than about 0.93. Isotactic triads are well-known in the art and are described in, for example, U.S. Pat. No. 5,504,172 and WO 00/01745, which refer to the isotactic sequence in terms of a triad unit in the copolymer molecular chain determined by 13C NMR spectra. Such propylene-based copolymers are further described in details in the U.S. Pat. Nos. 6,960,635 and 6,525,157, incorporated herein by reference. Such propylene/alpha-olefin copolymers are commercially available from The Dow Chemical Company, under the tradename VERSIFY™, or from ExxonMobil Chemical Company, under the tradename VISTAMAXX™.

In other embodiments, the base polymer may be ethylene-methyl acrylate (EMA) based polymers. In other particular embodiments, the ethylene-alpha olefin copolymer may be ethylene-butene, ethylene-hexene, or ethylene-octene copolymers or interpolymers. In other particular embodiments, the propylene-alpha olefin copolymer may be a propylene-ethylene or a propylene-ethylene-butene copolymer or interpolymer.

In one embodiment, the olefinic base polymer may have a density from 0.86 to 0.96 g/cc and a melt index, $I_2$, from 1 to 50 g/10 minutes.

In certain embodiments, the base polymer may be a propylene-ethylene copolymer or interpolymer having an ethylene content between 5 and 20 percent by weight and a melt flow rate (230° C. with 2.16 kg weight) from 0.5 to 300 g/10 min. In other embodiments, the propylene-ethylene copolymer or interpolymer may have an ethylene content between 9 and 12 percent by weight and a melt flow rate (230° C. with 2.16 kg weight) from 1 to 100 g/10 min.

In other embodiments, the base polymer may have a crystallinity of less than 50 percent. In other embodiments, the crystallinity of the base polymer may be from 5 to 35 percent. In other embodiments, the crystallinity may range from 7 to 20 percent.

In certain other embodiments, the base polymer is a semi-crystalline polymer and may have a melting point of less than 110° C. In some embodiments, the melting point may be from 25 to 100° C. In yet other embodiments, the melting point may be between 40 and 85° C.

In other selected embodiments, olefin block copolymers, e.g., ethylene multi-block copolymer, such as those described in the U.S. patent application Ser. No. 11/376,835 may be used as the base polymer. Nonlimiting examples of suitable ethylene/α-olefin multi-block copolymers are disclosed in U.S. Pat. No. 7,608,668, the disclosure of which is incorporated by reference herein.

In an embodiment, the ethylene/α-olefin multi-block copolymer is an ethylene/octene multi-block copolymer. The ethylene/octene multi-block copolymer is sold under the tradename INFUSE™ available from The Dow Chemical Company. Such olefin block copolymer may be an ethylene/α-olefin interpolymer:

(a) having a $M_w/M_n$ from about 1.7 to about 3.5, at least one melting point, $T_m$, in degrees Celsius, and a density, d, in grams/cubic centimeter, wherein the numerical values of $T_m$ and d corresponding to the relationship:

$T_m > -2002.9 + 4538.5(d) - 2422.2(d)^2$; or (b) having a $M_w/M_n$ from about 1.7 to about 3.5, and being characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH having the following relationships:

ΔT > −0.1299(ΔH) + 62.81 for ΔH greater than zero and up to 130 J/g,

ΔT ≥ 48° C. for ΔH greater than 130 J/g, wherein the CRYSTAF peak being determined using at least 5 percent of the cumulative polymer, and if less than 5 percent of the polymer having an identifiable CRYSTAF peak, then the CRYSTAF temperature being 30° C.; or (c) being characterized by an elastic recovery, Re, in percent at 300 percent strain and 1 cycle measured with a compression-molded film of the ethylene/α-olefin interpolymer, and having a density, d, in grams/cubic centimeter, wherein the numerical values of Re and d satisfying the following relationship when ethylene/α-olefin interpolymer being substantially free of a cross-linked phase:

Re > 1481 − 1629(d); or (d) having a molecular fraction which elutes between 40° C. and 130° C. when fractionated using TREF, characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/α-olefin interpolymer; or (e) having a storage modulus at 25° C., G' (25° C.), and a storage modulus at 100° C., G' (100° C.), wherein the ratio of G' (25° C.) to G' (100° C.) being in the range of about 1:1 to about 9:1.

The ethylene/α-olefin interpolymer may also:

(a) have a molecular fraction which elutes between 40° C. and 130° C. when fractionated using TREF, characterized in that the fraction having a block index of at least 0.5 and up to about 1 and a molecular weight distribution, $M_w/M_a$, greater than about 1.3; or (b) have an average block index greater than zero and up to about 1.0 and a molecular weight distribution, $M_w/M_n$, greater than about 1.3.

In certain embodiments, the olefinic base polymer comprises a polar polymer, having a polar group as either a comonomer or grafted monomer. In exemplary embodiments, the olefinic base polymer comprises one or more polar polyolefins, having a polar group as either a comonomer or grafted monomer. Exemplary polar polyolefins include, but are not limited to, ethylene-acrylic acid (EAA) and ethylene-methacrylic acid copolymers, such as those available under the trademarks PRIMACOR™, commercially available from The Dow Chemical Company, NUCREL™, commercially available from E.I. DuPont de Nemours, and ESCOR™, commercially available from ExxonMobil Chemical Company and described in U.S. Pat. Nos. 4,599,392, 4,988,781, and 5,938,437, each of which is incorporated herein by reference in its entirety. Other exemplary olefinic base polymers include, but are not limited to, ethylene ethyl acrylate (EEA) copolymer, ethylene methyl methacrylate (EMMA), and ethylene butyl acrylate (EBA).

In one embodiment, the olefinic polymer comprises a polar polyolefin selected from the group consisting of ethylene-acrylic acid (EAA) copolymer, ethylene-methacrylic acid copolymer, and combinations thereof.

Those having ordinary skill in the art will recognize that the above list is a non-comprehensive listing of exemplary base polymers. It will be appreciated that the scope of the present invention is restricted by the claims only.

Dispersant and Neutralizing Agent

In some embodiments, particularly those embodiments in which polymer(s) is (are) olefinic, the first polymeric dispersion comprises 2 to 40 percent by weight of one or more dispersants, based on the total weight of the solid content of the dispersion. All individual values and subranges from 2 to 40 weight percent are included herein and disclosed herein; for example, the dispersants can range from a lower limit of 2, 7, 12, 17, 22, or 25 weight percent to an upper limit of 15, 20, 25, 30, or 40 weight percent. For example, the dispersion may comprise from 2 to 40, or in the alternative from 5 to 30, or in the alternative from 10 to 34, or in the alternative from 15 to 40 percent by weight of one or more dispersants, based on the total weight of the solid content of the dispersion.

The dispersant may preferably be an external stabilizing agent. In selected embodiments, the dispersant may be a surfactant, a polymer, or mixtures thereof. In certain embodiments, the dispersant can be a polar polymer, having a polar group as either a comonomer or grafted monomer. In exemplary embodiments, the dispersant comprises one or more polar polyolefins, having a polar group as either a comonomer or grafted monomer or functional group. In an embodiment the dispersant is an acrylic dispersant. An "acrylic dispersant" is an acrylic-monomer containing material that promotes the formation and stabilization of a dispersion. Nonlimiting examples of suitable acrylic monomers for use in acrylic dispersants include alkyl (meth) acrylates, ethyl hexylacrylate (2-EHA), and combinations thereof. Nonlimiting examples of suitable monomer include nonionic copolymerized monoethylenically unsaturated monomers such as (meth)acrylic ester monomer including methyl (meth)acrylate (MMA), ethyl (meth)acrylate, butyl (meth)acrylate, 2-ethylhexyl (meth)acrylate, decyl (meth) acrylate, hydroxyethyl (meth)acrylate, hydroxypropyl (meth)acrylate, ureido-functional (meth)acrylates and acetoacetates, acetamides or cyanoacetates of (meth)acrylic acid; styrene or substituted styrenes; vinyl toluene; mono-ethylenically unsaturated acetophenone or benzophenone derivatives; vinyl acetate or other vinyl esters; vinyl monomers such as vinyl chloride, vinylidene chloride, N-vinyl pyrollidone; and (meth)acrylonitrile. The term "(meth)" followed by another term such as (meth)acrylate refers to both acrylates and methacrylates. In an embodiment, the acrylic dispersant contains at least one acrylic monomer and a carboxylic acid comonomer. Nonlimiting examples of suitable carboxylic acid comonomers include acrylic acid, methacrylic acid, crotonic acid, itaconic acid, fumaric acid, maleic acid, monomethyl itaconate, monomethyl fumarate, monobutyl fumarate, and maleic anhydride. In an embodiment, the acrylic dispersant is an alkyl (meth)acrylate/ carboxylic acid interpolymer. In a further embodiment, the acrylic dispersant is a 2-EHA/alkyl (meth)acrylate/carboxylic acid terpolymer.

Exemplary acrylic dispersants further include, but are not limited to, ethylene-acrylic acid (EAA) and ethylene-methacrylic acid copolymers, such as those available under the trademarks PRIMACOR, commercially available from The Dow Chemical Company, NUCREL, commercially available from E.I. DuPont de Nemours, and ESCOR, commercially available from ExxonMobil Chemical Company and described in U.S. Pat. Nos. 4,599,392, 4,988,781, and 5,938,437, each of which is incorporated herein by reference in its entirety. Other exemplary polymeric dispersants include, but are not limited to, ethylene ethyl acrylate (EEA) copolymer, ethylene methyl methacrylate (EMMA), and ethylene butyl acrylate (EBA). Other ethylene-carboxylic acid copolymer may also be used. Those having ordinary skill in the art will recognize that a number of other useful polymers may also be used.

In one embodiment, the acrylic dispersant is ethylene-free.

In another embodiment, the acrylic dispersant is an ethylhexyl acrylate/methyl methacrylate (MMA)/methacrylic acid terpolymer.

Other dispersants that may be used include, but are not limited to, long chain fatty acids, fatty acid salts, or fatty acid alkyl esters having from 12 to 60 carbon atoms. In other embodiments, the long chain fatty acid or fatty acid salt may have from 12 to 40 carbon atoms.

The dispersants may be partially or fully neutralized with a neutralizing agent. In certain embodiments, neutralization of the dispersants, such as a long chain fatty acid or EAA, may be from 100 to 140 percent on a molar basis; or in the alternative, from 100 to 120 percent on a molar basis. For example, for EAA, the neutralizing agent may be a base, such as ammonium hydroxide or potassium hydroxide, for example. Other neutralizing agents can include lithium hydroxide or sodium hydroxide, for example. In another alternative, the neutralizing agent may, for example, be a carbonate. In another alternative, the neutralizing agent may, for example, be any amine such as monoethanolamine, or 2-amino-2-methyl-1-propanol (AMP). Amines useful in embodiments disclosed herein may include monoethanolamine, diethanolamine, triethanolamine, and TRIS AMINO (each available from Angus), NEUTROL TE (available from BASF), as well as triisopropanolamine, diisopropanolamine, and N,N-dimethylethanolamine (each available from The Dow Chemical Company, Midland, MI). Other useful amines may include ammonia, monomethyl-amine, dimethylamine, trimethylamine, monoethylamine, diethylamine, triethylamine, mono-n-propylamine, dimethyl-n propylamine, N-methanol amine, N-aminoethylethanolamine, N-methyldiethanolamine, monoisopropanolamine, N,N-dimethyl propanolamine, 2-amino-2-methyl-1-propanol, tris(hydroxymethyl)-aminomethane, N,N,N'N'-tetrakis(2-hydroxylpropyl) ethylenediamine. In some embodiments, mixtures of amines or mixtures of amines and surfactants may be used. Those having ordinary skill in the art will appreciate that the selection of an appropriate neutralizing agent depends on the specific composition formulated, and that such a choice is within the knowledge of those of ordinary skill in the art.

Additional dispersing agents that may be useful in the practice of the present invention include, but are not limited to, cationic surfactants, anionic surfactants, or non-ionic surfactants. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide and silicone surfactants. Dispersants useful in the practice of the present invention can be either external surfactants or internal surfactants. External surfactants are surfactants that do not become chemically reacted into the base polymer during dispersion preparation. Examples of external surfactants useful herein include, but are not limited to, salts of dodecyl benzene sulfonic acid and lauryl sulfonic acid salt. Internal surfactants are surfactants that do become chemically reacted into the base polymer during dispersion preparation. An example of an internal surfactant useful herein includes 2,2-dimethylol propionic acid and its salts. Additional surfactants that may be useful in the practice of the present invention include cationic surfactants, anionic surfactants, non-ionic surfactants, or combinations thereof.

Various commercially available surfactants may be used as dispersants in embodiments disclosed herein, including: OP-100 (a sodium stearate), OPK-1000 (a potassium stearate), and OPK-181 (a potassium oleate), each available from RTD Hallstar; UNICID 350, available from Baker Petrolite; DISPONIL FES 77-IS and DISPONIL TA-430, each available from Cognis; RHODAPEX CO-436, SOPROPHOR 4D384, 3D-33, and 796/P, RHODACAL BX-78 and LDS-22, RHODAFAC RE-610, and RM-710, and SUPRAGIL MNS/90, each available from Rhodia; and TRITON QS-15, TRITON W-30, DOWFAX 2A1, DOWFAX 3B2, DOWFAX 8390, DOWFAX C6L, TRITON X-200, TRITON XN-45S, TRITON H-55, TRITON GR-5M, TRITON BG-10, and TRITON CG-110, each available from The Dow Chemical Company, Midland, Michigan.

The foregoing additional components are not present in all embodiments of the first polymer dispersion. For example, acrylic latex emulsions typically do not include the foregoing dispersants and neutralizing agent. Any method known in the art for forming such emulsions may be used in embodiments of the present invention.

Additional Components of the First Polymeric Dispersion

The first polymeric dispersion further comprises water. The first polymeric dispersion of the instant invention comprises 35 to 90 percent by volume of water, based on the total volume of the first polymeric dispersion. In particular embodiments, the water content may be in the range of from 35 to 90, or in the alternative from 35 to 65, or in the alternative from 45 to 55 percent by volume, or in the alternative from 50 to 90 percent by volume, based on the total volume of the first polymeric dispersion. Water content of the first polymeric dispersion may preferably be controlled so that the solids content is between about 1 percent to about 74 percent by volume. In particular embodiments, the solids range may be between about 10 percent to about 70 percent by volume. In other particular embodiments, the solids range is between about 20 percent to about 60 percent by volume. In certain other embodiments, the solids range is between about 30 percent to about 55 percent by volume.

The first polymeric dispersion may optionally further include other additives. For example, additives may include compatibilizers, wetting agent, surfactants (added following formation of the dispersion), anti-static agents, antifoam agent, anti-block agents, wax-dispersion pigments, a neutralizing agent, fire retardants, a thickener, a brightener, a rheology modifier, a biocide, a fungicide, a shear stabilizer, a UV stabilizer, a coefficient of friction modifier, and other additives known to those skilled in the art. While optional for purposes of the present invention, other components may be highly advantageous for product stability during and after the manufacturing process.

Compatibilizers may include those previously described in the art such as maleated waxes and may be present in amounts from 0 to 15 wt % of the dispersion, based on the total solids weight of the first polymeric dispersion.

The first polymeric dispersion used in the invention exhibits a volume average particle size diameter of less than or equal to 1 micron. All individual particle size diameters of less than or equal to 1 micron are included and disclosed herein. For example, the volume average particle size diameter of the dispersion may have an upper limit of 1, 0.5, 0.25 or 0.1 microns. For example, the volume average particle size diameter may range from 0.1 to 1 microns, or in the alternative, from 0.5 to 1 microns, or in the alternative, from 0.5 to 1 micron.

The dispersion used in the invention exhibits a solids content of from 1 to 60 wt %. All individual values and ranges from 1 to 60 wt % are included and disclosed herein. For example, the solids content of the first polymeric dispersion may range from 1 to 60 wt %, or in the alternative, from 30 to 65 wt %, or in the alternative, from 25 to 60 w %.

In some embodiments, the first polymeric dispersion used in the invention exhibits a pH of 8 or greater. All values from 8 or greater are included and disclosed herein. For example, the pH of the dispersion may be from 8 to 10, or in the alternative, from 8 to 11.

Forming the First Polymeric Dispersion

The first polymeric dispersion may be prepared, in some embodiments, in an extrusion process, e.g., as discussed in U.S. Pat. No. 8,318,257, the disclosure of which is incorporated herein by reference.

Any melt-kneading means known in the art may be used. In some embodiments, a kneader, a BANBURY mixer, single-screw extruder or a multi-screw extruder is used. A process for producing the dispersions in accordance with the present invention is not particularly limited. One preferred process, for example, is a process comprising melt-kneading the above-mentioned components according to U.S. Pat. Nos. 5,756,659 and 6,455,636.

FIG. 1 illustrates an exemplary a schematic diagram of an extrusion apparatus for manufacturing an aqueous polymer dispersion, as used in the invention. An extruder 30, such as a twin screw extruder, may be coupled to a control valve 32, for controlling extruder discharge pressure. In some embodiment, control valve 32 may be a V-ball control valve. In other embodiments, control valve 32 may be a micro-notch V-ball control valve. Neutralizing agent reservoir 34 and an initial dispersion medium reservoir 36, each of which includes a pump (not shown), may also be provided. Desired amounts of neutralizing agent and initial dispersion medium, herein water, are provided from the neutralizing agent reservoir 34 and the initial water reservoir 36, respectively.

Polymer resin(s), in the form of pellets, powder, or flakes, for example, may be fed from the feeder 37 to an inlet 38 of the extruder 30. The dispersant is typically added to the extruder through and along with the resin but may be provided separately to the twin screw extruder 30. The polymer and dispersant are then melted, mixed, and conveyed by screws 40 in mix and convey zone 42. Alternatively, the dispersant may be delivered in liquid form by way of any appropriate liquid injector or pump.

The resin melt is then delivered from the mix and convey zone to a high internal phase emulsion creation zone 43 (referred to herein as the "HIPE zone") of the extruder. In the HIPE zone, an initial amount of water and neutralizing agent from the reservoirs 34 and 36 is added through inlet 44.

In the HIPE zone 43, the dispersion particle size is formed, based upon the interfacial chemistry of the mixture components, the mass transfer of the neutralizing agent, and the distributive and dispersive mixing imparted by the screws 40, including the stress, strain and passage frequency.

The emulsified mixture may be further diluted with additional water via one or more of inlet 46, 47, 48 from reservoir 50 in dilution zone 52 of the extruder 30. Typically, the dispersion is diluted to at least 30 weight percent water in dilution zone 52. In dilution zone 52, the packing fraction of the dispersion particles and the viscosity of the mixture are reduced. For example, the viscosity may be reduced from a magnitude of about $10^6$ to about $10^2$ centipoise ("cP").

A cooling zone 54 may be located toward the end of screw 40, near the outlet of extruder 30. Cooling zone 54, providing heat exchange between the dispersion mixture and a cooling medium, not shown, may be used to cool the dispersion mixture to a temperature below that of the boiling point of the dispersion medium. For example, where the dispersion medium is water, the dispersion mixture may be cooled to a temperature below about 100° C. The reduction in dispersion mixture temperature may allow further processing of the mixture without unwanted loss of dispersion medium through evaporation.

The cooled dispersion may then exit extruder 30 via outlet 56. Outlet 56 may be coupled to control valve 32, as described above, to maintain extruder discharge pressure control.

Regarding screws 40 and the internals of extruder 30, one or more rotating restriction orifices 58 may be located along screw 40 in some embodiments. In addition to control valve 32, rotating restriction orifices 58 may improve stability of the dispersion forming process. In other embodiments, non-rotating restriction orifices, not shown, may be used.

Screws 40 may also include high-mixing kneading disks 60 in some embodiments. In addition to the high-mixing kneading disks 60 described above, embodiments of the extrusion apparatus disclosed herein may also include low free volume kneading disks 62, which may minimize the volume weighted particle size distribution of dispersions formed using extruder 30.

In other embodiments of the extrusion apparatus, the reverse elements may be removed, preventing unwanted back mixing. Additionally, the melt seal may be located directly upstream of the HIPE zone in some embodiments.

As illustrated in FIG. 1, HIPE zone 43 may be variable in length. Depending upon the feed composition (such as the polymer, dispersing agent, neutralizing agent, etc.), it may be desirable to have a longer or a shorter HIPE zone. Multiple dispersion medium injection points 46, 47, 48 may be provided to allow the HIPE zone to be extended or shortened as needed. As the particle size of the dispersed polymer particles is formed in the HIPE zone, adequate mixing should be provided to develop the desired particle size. Having a variable length for the HIPE zone may allow for a broader range of polymers to be processed in a single extruder, providing for process flexibility, among other benefits.

The foregoing method is generally used in forming first polymeric dispersions in which the polymer component is one or more polyolefins. For those embodiments in which the polymer component is a polyester, polyurethane, epoxy, cellulosic, acrylates (including methacrylates), and polystyrenes may be produced using any method of forming polymer dispersions (including emulsions and suspensions) known in the art.

Second Polymeric Component

The inventive coating composition comprises a second polymeric component which comprises one or more second polymeric emulsions wherein polymers contained in the second polymeric emulsions have a surface free energy equal to or less than 26 mJ/m$^2$ and a volume average particle size diameter from 0.005 to 1,000 microns. All individual values and subranges from equal to or less than 26 mJ/m$^2$ are included and disclosed herein; for example, the surface free energy of the polymers in the second polymeric emulsions may range from an upper limit of 26, 24, 22 or 20 mJ/m$^2$. For example, the surface free energy of the polymers in the second polymeric emulsions may range from 10 to 26 mJ/m$^2$, or in the alternative, from 15 to 26 mJ/m$^2$, or in the alternative, from 10 to 22 mJ/m$^2$, or in the alternative, from 12 to 24 mJ/m$^2$. All individual values and subranges from 0.005 to 1,000 microns are included and disclosed herein; for example, the volume average particle size diameter of the solids in the second polymeric emulsion may range from a lower limit of 0.005, 0.05, 0.5, 5, 50 or 500 microns to an upper limit of 1, 0.1, 1, 10, 100 or 1,000 microns. For example, the volume average particle size diameter of the solids in the second polymeric emulsion may range from 0.005 to 1,000 microns, or in the alternative, from 0.1 to 500, or in the alternative, from 0.1 to 10 microns.

The second polymeric emulsion comprises a silicone compound, an emulsifying agent, and water. Any emulsifiable silicone polymer may be used in the second polymeric emulsion. Such organopolysiloxanes are disclosed in, for example, US20130143989, US20130121949, US20130122204, US20170000722, US20140371317, and US20130338239, the disclosures of which are incorporated herein by reference. Additional organopolysiloxanes, useful in airbag applications, are disclosed in WO2001012894 and WO2011060238, the disclosures of which are incorporated herein by references.

In certain embodiments, the organopolysiloxane contains at least two groups selected from the group consisting of the silicon-bonded hydroxyl group, silicon-bonded alkoxy groups, and silicone polyethers. The molecular structure of the organopolysiloxane may be straight chain, cyclic, branched, dendritic, or network. The groups silicon-bonded groups are selected from the group consisting of the hydroxyl group, alkoxy groups, and alkoxyalkoxy groups may be present in terminal position on the molecular chain or in side chain position on the molecular chain or in both positions. The alkoxy group is preferably an alkoxy group having from 1 to 10 carbon atoms, e.g., methoxy group, ethoxy group, n-propoxy group, isopropoxy group, n-butoxy group, t-butoxy group, hexyloxy group, cyclohexyloxy group, octyloxy group, decyloxy group, and so forth, while the alkoxyalkoxy group is preferably an alkoxyalkoxy group having from 2 to 10 carbon atoms, e.g., methoxymethoxy group, methoxyethoxy group, ethoxymethoxy group, methoxypropoxy group, and so forth.

Unsubstituted monovalent hydrocarbyl groups and substituted monovalent hydrocarbyl groups are examples of the silicon-bonded organic groups other than the groups selected from the group consisting of the hydroxyl group, alkoxy groups, and polyether groups. The unsubstituted monovalent hydrocarbyl can be exemplified by alkyl groups having from 1 to 10 carbon atoms such as methyl group, ethyl group, n-propyl group, isopropyl group, butyl group, t-butyl group, hexyl group, octyl group, decyl group, and so forth; cycloalkyl groups having from 3 to 10 carbon atoms such as cyclopentyl group, cyclohexyl group, and so forth; alkenyl groups having from 2 to 10 carbon atoms such as vinyl group, allyl group, 5-hexenyl group, 9-decenyl group, and so forth; aryl groups having from 6 to 10 carbon atoms such as phenyl group, tolyl group, xylyl group, and so forth; and aralkyl groups having from 7 to 10 carbon atoms such as benzyl group, methylbenzyl group, phenethyl group, and so forth. Preferred are alkyl group, alkenyl group, and aryl group, wherein methyl group and phenyl group are particularly preferred.

In other embodiments, the substituted monovalent hydrocarbyl group can be exemplified by groups provided by replacing all or a portion of the hydrogen atoms in the aforementioned unsubstituted monovalent hydrocarbyl groups, and particularly in the alkyl group having from 1 to 10 carbon atoms or phenyl group, with a halogen atom such as fluorine, chlorine, and so forth; an epoxy functional group such as glycidyloxy group, epoxycyclohexyl group, and so forth; a methacrylic functional group such as methacryloxy group and so forth; an acrylic functional group such as acryloxy group and so forth; an amino functional group such as the amino group, aminoethylamino group, phenylamino group, dibutylamino group, and so forth; a sulfur containing functional group such as the mercapto group, the tetrasulfide group, and so forth; or a substituent group such as alkoxy group, hydroxycarbonyl group, alkoxycarbonyl group, and so forth. Additional amino functional groups useful in embodiments of the present invention are disclosed in US20140308229, the disclosure of which is incorporated herein by reference. Non-limiting examples include —CH$_2$CH$_2$NH$_2$, —CH$_2$CH$_2$CH$_2$NH$_2$, —CH$_2$CH(CH$_3$)NH$_2$, —CH$_2$CH$_2$CH$_2$CH$_2$NH$_2$, —CH$_2$CH$_2$CH$_2$CH$_2$CH$_2$NH$_2$, —CH$_2$CH$_2$CH$_2$CH$_2$CH$_2$CH$_2$NH$_2$, —CH$_2$CH$_2$NHCH$_3$, —CH$_2$CH$_2$CH$_2$NHCH$_3$, —CH$_2$CH(CH$_3$)CH$_2$NHCH$_3$, —CH$_2$CH$_2$CH$_2$CH$_2$NHCH$_3$, —CH$_2$CH$_2$NHCH$_2$CH$_2$NH$_2$, —CH$_2$CH$_2$CH$_2$NHCH$_2$CH$_2$NH$_2$, —CH$_2$CH$_2$CH$_2$NHCH$_2$CH$_2$CH$_2$NH$_2$, —CH$_2$CH$_2$CH$_2$CH$_2$NHCH$_2$CH$_2$CH$_2$NH$_2$, —CH$_2$CH$_2$NHCH$_2$CH$_2$NHCH$_3$, —CH$_2$CH$_2$CH$_2$CH$_2$NHCH$_2$CH$_2$CH$_2$NHCH$_3$, —CH$_2$CH$_2$CH$_2$CH$_2$NHCH$_2$CH$_2$CH$_2$CH$_2$NHCH$_3$, and —CH$_2$CH$_2$NHCH$_2$CH$_2$NHCH$_2$CH$_2$CH$_3$; —CH$_2$CH(CH$_3$)CH$_2$NHCH$_2$CH$_2$NH$_2$ or CH$_2$CH$_2$CH$_2$NHCH$_2$CH$_2$NH$_2$.

Nonlimiting examples of the substituted monovalent hydrocarbyl group include 3,3,3-trifluoropropyl group, perfluorobutylethyl group, perfluorooctylethyl group, 3-chloropropyl group, 3-glycidyloxypropyl group, 2-(3,4-epoxycyclohexyl)ethyl group, 5,6-epoxyhexyl group, 9,10-epoxydecyl group, 3-methacryloxypropyl group, 3-acryloxypropyl group, 11-methacryloxy undecyl group, 3-aminopropyl group, N-(2-aminoethyl)aminopropyl group, 3-(N-phenylamino)propyl group, 3-dibutylaminopropyl group, 3-mercaptopropyl group, 3-hydroxycarbonylpropyl group, methoxypropyl group, and ethoxypropyl group.

The second polymeric emulsion further comprises an emulsifying agent. The emulsifying agent may be ionic or nonionic or combination thereof.

Nonlimiting examples of anionic emulsifying agents include alkylbenzenesulfonate salts, alkyl ether sulfate salts, polyoxyethylene alkyl ether sulfate salts, polyoxyethylene alkylphenyl ether sulfate salts, alkylnaphthylsulfonate salts, unsaturated aliphatic sulfonate salts, and hydroxylated aliphatic sulfonate salts. The alkyl group referenced here can be exemplified by medium and higher alkyl groups such as decyl group, undecyl group, dodecyl group, tridecyl group, tetradecyl group, cetyl group, stearyl group, and so forth. The unsaturated aliphatic group can be exemplified by oleyl group, nonenyl group, and octynyl group. The counterion can be exemplified by the sodium ion, potassium ion, lithium ion, and ammonium ion, with the sodium ion being typically used among these.

Nonlimiting examples of cationic emulsifying agents include quaternary ammonium salt type surfactants such as alkyltrimethylammonium salts, e.g., octadecyltrimethylammonium chloride, hexadecyltrimethylammonium chloride, and so forth, and dialkyldimethylammonium salts, e.g., dioctadecyldimethylammonium chloride, dihexadecyldimethylammonium chloride, didecyldimethylammonium chloride, and so forth.

Nonlimiting examples of amphoteric emulsifying agents include alkylbetaines and alkylimidazolines.

Nonlimiting examples of nonionic emulsifying agents can include glycerol fatty acid esters, sorbitan fatty acid esters, polyoxyalkylene alkyl ethers, polyoxyalkylene alkylphenyl ethers, polyoxyalkylene sorbitan fatty acid esters, polyoxyalkylene glycerol fatty acid esters, and polyoxyethylene-polyoxypropylene copolymer-type nonionic emulsifying agents. The alkyl group referenced here can be exemplified by higher alkyl groups such as decyl group, undecyl group, dodecyl group, tridecyl group, tetradecyl group, cetyl group, stearyl group, and so forth. The fatty acid can be exemplified by medium and higher fatty acids such lauric acid, palmitic acid, stearic acid, oleic acid, and so forth.

The second polymeric emulsion further comprises water. Additional optional components of the second polymeric emulsion may include fillers, crosslinkers, flame retardants, thickeners, biocides, pH adjusters, salts and adhesion promoters.

In some embodiments, the second polymeric emulsion comprises from 1 to 98 wt % silicone. All individual values and subranges from 1 to 98 wt % are included and disclosed herein; for example, the amount of silicone may range from a lower limit of 1, 10, 20, 30, 40, or 50 wt % to an upper limit of 40, 50, 60, 70, 80, 90, or 98 wt %. For example, the amount of silicone may range from 1 to 98 wt %, or in the alternative, from 50 to 98 wt %, or in the alternative from 1 to 50 wt %, or in the alternative, from 40 to 90 wt %.

In some embodiments, the one or more organopolysiloxanes polymers have a weight average molecular weight ($M_w$) from 1,000 to 1,000,000. All individual values and subranges from 1,000 to 1,000,000 are included and disclosed herein; for example, the molecular weight may range from a lower limit of 1,000; 50,000; 100,000; or 500,000 (daltons) to an upper limit of 150,000; 550,000; 750,000 or 1,000,000 (daltons). For example, the $M_w$ of the organopolysiloxanes may range from 1,000 to 1,000,000, or in the alternative, from 1,000 to 500,000, or in the alternative, from 500,000 to 1,000,000.

In some embodiments, the second polymeric emulsion has an internal phase viscosity from 50 to 30,000,000 cPs. All individual values and subranges from 50 to 30,000 cPs are included and disclosed herein; for example, the internal phase viscosity may range from a lower limit of 50, 500, or 5,000 cPs to an upper limit of 10,000; 20,000; or 30,000 cPs.

In some embodiments, the second polymeric emulsion has a volume average particle size diameter from 0.005 to 1,000 micrometers. All individual values and subranges from 0.005 to 1,000 micrometers are included and disclosed herein; for example, the volume average particle size diameter of the second polymeric emulsion may range from a lower limit of 0.005, 0.05, 0.5, 5, 50 or 100 micrometers to an upper limit of 5, 50, 500 or 1,000 micrometers. For example, the volume average particle size diameter of the second polymeric emulsion may range from 0.005 to 1,000, or in the alternative, from 0.005 to 500, or in the alternative, from 0.01 to 100, or in the alternative, from 0.05 to 500 micrometers.

The emulsion may be formed by any means known in the art, generally mixing the emulsion components, with or without shear. Mixing can be accomplished by any method known in the art to effect mixing of high viscosity materials. The mixing may occur either as a batch, semi-continuous, or continuous process. Mixing may occur, for example using, batch mixing equipment with medium/low shear include change-can mixers, double-planetary mixers, conical-screw mixers, ribbon blenders, double-arm or sigma-blade mixers; batch equipment with high-shear and high-speed dispersers include those made by Charles Ross & Sons (NY), Hockmeyer Equipment Corp. (NJ); batch mixing equipment such as those sold under the tradename Speedmixer®; batch equipment with high shear actions include Banbury-type (CW Brabender Instruments Inc., NJ) and Henschel type (Henschel mixers America, TX). Illustrative examples of continuous mixers/compounders include extruders single-screw, twin-screw, and multi-screw extruders, co-rotating extruders, such as those manufactured by Krupp Werner & Pfleiderer Corp (Ramsey, N.J.), and Leistritz (NJ); twin-screw counter-rotating extruders, two-stage extruders, twin-rotor continuous mixers, dynamic or static mixers or combinations of these equipment.

Additional Coating Composition Components

Generally, the coating composition comprises from 50 to 99.9 wt % of the first polymeric component, based on a total solids content of the coating composition. All individual values and subranges from 50 to 99.9 wt % are included and disclosed herein; for example, the amount of the first polymeric component can range from a lower limit of 50, 60, 70, 80, or 90 wt % to an upper limit of 55, 65, 75, 85, 95 or 99.9 wt %, based on a total solids content of the coating composition. For example, the amount of the first polymeric component in the coating composition may be from 50 to 99.9 wt %, or in the alternative, from 50 to 75 wt %, or in the alternative, from 75 to 99.9 wt %, or in the alternative, from 65 to 95 wt %, based on a total solids content of the coating composition. The coating composition comprises from 0.1 to 50 wt % of the second polymeric emulsion, based on a total solids content of the coating composition. All individual values and subranges from 0.1 to 50 wt % are included and disclosed herein; for example, the amount of the second polymeric emulsion may range from a lower limit of 0.1, 1, 10, 20, or 30 wt % to an upper limit of 5, 15, 25, 35, 45 or 50 wt %, based on a total solids content of the coating composition. For example, the amount of the second polymeric emulsion may be from 0.1 to 50 wt %, or in the alternative, from 0.1 to 25 wt %, or in the alternative, from 25 to 50 wt %, or in the alternative from 5 to 35 wt %, based on a total solids content of the coating composition.

The second polymeric emulsion generally comprises from 1 to 60 wt % solid components and from 99 to 40 wt % water. All individual values and subranges from 1 to 60 wt % are included and disclosed herein; for example, the solids content of the second polymeric emulsion can range from a lower limit of 1, 10, 20, or 30 wt % to an upper limit of 25, 35, 45, 55 or 60 wt %. All individual values and subranges from 99 to 40 wt % are included and disclosed herein; for example, the amount of water in the second polymeric emulsion may range from a lower limit of 40, 50, 60 or 70 wt % to an upper limit of 60, 70, 80, 90, or 99 wt %.

The coating composition further comprises one or more rheology modifiers and optionally one or more second neutralizing agents. One skilled in the art would understand that the amounts of the rheology modifiers and neutralizing agents may be coordinated so as to achieve a viscosity appropriate for application while maintaining a basic pH, as is appropriate to keep the dispersion stable. The use of and/or amount of rheology modifier may further depend upon other components to the coating composition. For example, fillers may be included in the coating composition; such fillers may impact viscosity and therefore, impact the amount of rheology modifier needed.

In one embodiment, a second neutralizing agent is from 0 to 15% by volume of the total coating composition volume. All individual values and ranges from 0 to 15% by volume are included and disclosed herein; for example, the amount of second neutralizing agent can range from a lower limit of 0, 3, 6, 9, or 12% by volume to an upper limit of 4, 7, 10, 13 or 15% by volume. For example, the amount of second neutralizing agent can be from 0 to 15% by volume, or in the alternative, from 5 to 15% by volume, or in the alternative, from 0 to 5% by volume, or in the alternative, from 2 to 10% by volume. Any neutralizing agent known in the art may be used as the second neutralizing agent, including organic and/or inorganic bases, as discussed previously in connection with the dispersion.

Any rheology modifier known in the art may be used. In particular embodiments, the rheology modifier may be selected from the group consisting of carboxylic acid polymers, cellulosic compounds, crosslinked polyacrylate polymers, polyacrylamide polymers, polysaccharides, and gums. In one embodiment, the rheology modifier is selected from the ACRYSOL line of rheology modifiers (available from The Dow Chemical Company).

The coating composition may further include one or more additives selected from the group consisting of flame retardants, antiblocking agents, solvents, stabilizers, and pigments. Any such additives known in the art may be used. Exemplary flame retardants include phosphonate esters, phosphate esters, halogenated phosphonate esters or combinations thereof. Other flame retardants such as zeolites, hydrated phosphates, alkali silicates, borates, borosilicates, melamine, graphite, graphene, mica, vermiculites, alumina, aluminum hydroxide, perlites, antimony trioxide, polyphosphate, melamine can also be used.

Halogen free flame retardants, such as diethylethane phosphonate (DEEP); triethylphosphate (TEP); dimethyl-propylphosphate (DMPP); diphenylcreysl phosphate (DCP) can also be used.

Coating Composition Formation and Coating Application

Coating composition components may be blended using any known method. The viscosity and pH of the coating composition may be adjusted as needed. Alternatively, the viscosity may be adjusted following delivery to an end user, as may be appropriate for the chosen coating method.

The coating composition may be applied to any woven or nonwoven fabric. Non-limiting examples of suitable fabrics include those made from synthetic or natural fibers, such as polyesters, polyimides, polyethylenes, polypropylenes, polyester-cotton blends, glass fibers, and polyamides. In a particular embodiment, the fabric is a polyester and/or nylon-66.

The coating compositions may be applied according to known techniques to the fabric. Such techniques include knife coating, roll coating, dip coating, flow coating, squeeze coating, and spray coating. Knife coating methods includes knife-over-air, knife-over-roll, knife-over-foam, and knife-over-gap table methods. Roll coating methods includes single-roll, double-roll, multi-roll, reverse roll, gravure roll, and transfer-roll coating methods. In a particular embodiment, the coating composition is applied by a knife-over-air or knife-over-roller coating method.

The coating composition may be applied to the fabric at a coat weight prior to curing of from 20 to 150 g/m$^2$. All values and subranges from 20 to 150 g/m$^2$ are included and disclosed herein. For example, the coat weight prior to curing may range from a lower limit of 20, 40, 60, 80, 100, 120 or 150 g/m$^2$ to an upper limit of 50, 70, 90, 110, 130 or 150 g/m$^2$. For example, the wet coating weight may range from 20 to 150, or in the alternative, from 50 to 150, or in the alternative, from 70 to 120 g/m$^2$.

The viscosity of the coating composition may be adjusted according to the desired application technique. In one embodiment, the viscosity of the coating composition is adjusted to from 1000 to 4000 cPs. All individual values and subranges from 1000 to 4000 cPs are included herein; for example, the viscosity may be adjusted to a range having a lower limit of 1000, 1500, 2000, 2500 or 3000 cPs to an upper limit of 2250, 2750, 3250, or 4000 cPs. For example, the viscosity of the coating composition may be adjusted to a range of from 1000 to 4000 cPs, or in the alternative, from 1000 to 3000 cPs, or in the alternative, from 2000 to 4000 cPs, or in the alternative, from 1750 to 3750 cPs.

Following coating composition application, the coating is cured by removing the water from the coating composition and melting the polymeric components of the coating composition to form a polymer film. In a particular embodiment, the coated fabric is cured by ambient exposure to 190° C. for a period of 5 minutes or, in the alternative, for a sufficient time to remove the water. In another embodiment, the coating is cured by ambient exposure to an increasing temperature ramp ranging from about 24° C. to 200° C. All individual values and subranges from 24° C. to 200° C. are included and disclosed herein. For example, the temperature ramp may range from 24 to 200° C., or in the alternative, from 30 to 155° C., or in the alternative, from 27 to 160° C. The upper limit will be dependent upon the melting point of the solid components of the dispersion, and therefore, the limits of 24° C. to 200° C. are merely illustrative and not restrictive. The temperature ramp may be continuous or discontinuous. That is, the change in temperature may be gradual or the temperature may be changed discontinuously in different zones. Further, one skilled in the art would readily understand that the temperature needed to drive off the water or to melt the polymeric dispersion components is impacted by pressure. For example, under sufficiently low pressure, the water may be removed without raising the temperature above ambient temperature.

Following removal of water and formation of the coating film, the coat weight may range from 20 to 50 g/m². All values and subranges from 20 to 50 g/m² are included and disclosed herein. For example, the coat weight after curing may range from a lower limit of 20, 22, 24, 26, 28, 30, or 32 g/m² to an upper limit of 27, 29, 31, 33, 40 or 50 g/m². For example, the cured coating weight may range from 20 to 50, or in the alternative, from 21 to 28, or in the alternative, from 20 to 33, or in the alternative, from 28 to 34 g/m².

During the curing process, the first polymeric dispersion and the second polymeric emulsion exhibit self-stratification wherein the second polymeric emulsion selectively migrates to the surface of the applied coating. As a consequence, the portion of the cured coating closest to the fabric comprises primarily a hydrocarbon content whereas the portion of the cured coating closest to the coating surface comprises a higher silicone content than at the portion of the cured coating closer to the fabric.

In one embodiment, the outer surface (surface furthest from the fabric) comprises from 10 to 25 atomic % silicon. All individual values and subranges from 10 to 25 atomic % (at %) are included and disclosed herein. For example, the at % of silicon on the surface may range from a lower limit of 10, 12, 14 or 16 to an upper limit of 14, 18, 22 or 25. For example, the amount of silicon on the coating surface may range from 10 to 25 at %, or in the alternative, from 12 to 20 at %, or in the alternative, from 14 to 19 at %, or in the alternative, from 15 to 25 at %.

In some embodiments, the amount of silicon at a depth of 40 nm from the cured coating surface may range from 0 to 5 at %. All individual values and subranges from 0 to 5 at % are included and disclosed herein. For example, the amount of silicon at a depth of 40 nm from the cured coating surface may range from a lower limit of 0, 0.3, 0.5 or 1 at % to an upper limit of 0.5, 0.8, 2, or 5 at %. For example, the amount of silicon in the cured coating at a depth of 40 nm from the coating surface may range from 0 to 5 at %, or in the alternative, from 0.2 to 3 at %, or in the alternative, from 0 to 2 at %, or in the alternative from 0.5 to 1.5 at %, or in the alternative, from 1 to 5 at %. As shown by the data in Table VIIIA, the atomic percentage of silicon decreases gradually with increasing distance from the coating surface (depth).

Following curing, one or more additional coatings may optionally be applied to the coated fabric. Such additional coatings may include those known in the art to improve or impart properties, such as to lower the coefficient of friction, increase block resistance, and increase scrub resistance. In one embodiment, an additional coating comprising a polyorganosiloxane and/or polymer silicone material is added to the inventive coated fabric.

End-Uses and Properties

The coating composition of the present invention may be used, for example, in those applications requiring retention of air and/or other gas pressure. Non-limiting examples of such applications include vehicle air bags, aircraft emergency chutes.

The cured coated fabric of the invention exhibits a pressure retention of greater than or equal to 95% of an applied pressure of 200 kPa for a period of equal to or greater than 15 seconds. All individual values from greater than or equal to 95% and equal to or greater than 15 seconds are included herein. For example, the coated fabric may retain greater than or equal to 95%, 96%, 97%, 98%, or 99% of an applied pressure of 200 kPa, for a period of at least 15, 20, 25, 30 or 45 seconds. Based on the pressure retention values, it is clear that the coated fabric displays a pressure drop of equal to or less than 5% at an applied pressure of 200 kPa for a period of equal to or greater than 15 seconds. All individual values from less than or equal to 5% and equal to or greater than 15 seconds are included herein. For example, the coated fabric may have a pressure drop of equal to or less than 5%, 4, 3%, 2%, or 1% of an applied pressure of 200 kPa, for a period of at least 15, 20, 25, 30 or 45 seconds.

In one embodiment, the cured coated fabric exhibits a static coefficient of friction (COF) of equal to or less than 1. All individual values and subranges from equal to or less than 1 are included and disclosed herein; for example, the static coefficient of friction may be from an upper limit of 1, 0.9, 0.7, 0.5, or 0.3. For example, the static coefficient of friction may range from 0.2 to 0.92, or in the alternative, from 0.2 to 0.5, or in the alternative from 0.2 to 0.4, or in the alternative, from 0.2 to 1.

In one embodiment, the cured coated fabric exhibits a dynamic coefficient of friction (COF) of equal to or less than 1. All individual values and subranges from equal to or less than 1 are included and disclosed herein; for example, the static coefficient of friction may be from an upper limit of 1, 0.9, 0.7, 0.5, or 0.3. For example, the static coefficient of friction may range from 0.1 to 0.8, or in the alternative, from 0.1 to 0.5, or in the alternative from 0.1 to 0.4, or in the alternative, from 0.1 to 0.6.

In one embodiment, the cured coated fabric exhibits a scrub resistance of equal to or greater than 40 scrubs. All individual values and subranges from equal to or greater than 40 are included and disclosed herein; for example, the scrub resistance can range from a lower limit of 40, 50, 60, or 80 scrubs. For example, the scrub resistance may range from 40 to 500, or in the alternative, from 40 to 400, or in the alternative, from 50 to 350 scrubs.

In one embodiment, the present invention provides a coated fabric comprising: a woven or nonwoven substrate; and a coating derived from the inventive coating composition. In another embodiment, the present invention provides an article comprising the coated fabric. Non-limiting examples of such articles include airbags for use in motor vehicles and emergency chutes.

Air bags are generally formed from a woven or knitted fabric made of synthetic fiber, for example of polyamide such as nylon-6,6 or polyester, coated on at least one of its sides. Air bags may be made of flat fabric pieces which are coated and then sewn together to provide sufficient mechanical strength or may be woven in one piece with integrally woven seams. Sewn air bags are generally assembled with the coated fabric surface at the inside of the air bag. One-piece woven air bags are coated on the outside of the air bag. The present invention provides any for of airbag which comprises the inventive coated fabric. In one embodiment, the invention provides a side impact airbag. In another embodiment, the invention provides a driver or passenger front airbag.

As used herein, the term "remains deployed" signifies retention of at least 50% of the initial deployment pressure of the airbag.

Examples

The following examples illustrate the present invention but are not intended to limit the scope of the invention.

Dispersion Examples

Dispersions 1 and 2 were prepared according to the following process.

The dispersions were prepared using a 12 zone 25 mm BERSTORFF. The polyolefin resin was delivered to the system as a pellet through a large Schenk feeder that dropped into the feed throat. The compatibilizer was delivered using a KQX K-tron feeder that also dropped into the feed throat. The dispersant was delivered to the system as a liquid via a 1000D ISCO syringe pump through an injector that was located in Zone 5A or as a solid delivered using a KQX K-tron feeder that also dropped into the feed throat. The initial water was delivered via a 500D ISCO pump through an injector that was placed in Zone 4B. Base was added to provide 100-140% neutralization and delivered via a 500D ISCO pump that was piped in with the initial water. Base was also added through Zone 4B. Finally, the dilution water was delivered via a large Hydracell pump through an injector that was placed in Zone 8A. Table I lists the specific components for each Dispersions 1 and 2 and the wt % solids and volume average particle size for each of the dispersions. Table II provides information on dispersion and coating composition components.

TABLE I

| Dispersion Composition, wt % of total solids | Disp. 1 | Disp. 2 |
| --- | --- | --- |
| INFUSE 9807 | 86 | |
| INFUSE 9817 | | 89 |
| Honeywell AC 575 | 7 | |
| UNICID 350 | 7 | |
| LICOCENE 4351 | | 7 |
| Oleic Acid | | 4 |
| Neutralization @ 140% with | DMEA | KOH (30% in $H_2O$) |
| Water | | |
| Total Solids | 100 | 100 |
| Solids % | 50 | 49 |
| Particle Size (Vmean, microns) | 0.3 | 0.5 |

TABLE II

| | Composition | Source | Properties |
| --- | --- | --- | --- |
| INFUSE 9807 | ethylene/octene block copolymer | Dow | Density: 0.866 g/cm$^3$<br>$I_2$ = 15 g/10 min<br>Melting temperature (Tm) = 118° C. |
| INFUSE 9817 | ethylene/octene block copolymer | Dow | Density = 0.877 g/cm$^3$<br>$I_2$= 15 g/10 min,<br>Melting temperature (Tm) = 120° C. |
| RHOPLEX SG-30 | Acrylic Latex | Dow | |
| PRIMAL U-91 | Polyurethane dispersion (aqueous dispersion of an aliphatic polyurethane dispersion) | Dow | |
| Honeywell AC 575 | Ethylene Maleic Anhydride Copolymer | Honeywell | Density (ASTM D-1505) = 0.92 g/cm$^3$ |
| UNICID 350 | Long chain, linear carboxylic acid | Baker Hughes | |
| LICOCENE 4351 | Maleic anhydride grafted PE wax | Clariant | Acid Value (measured by QM-AA-351a) = 42-49 mg KOH/g<br>Density (measured by ISO 1183 @ 23° C.) = 0.98-1.0 g/cm$^3$ |
| ACRYSOL ASE-60 | Acrylic Rheology Modifier (acid containing, cross-linked acrylic emulsion copolymer) | Dow | |
| DC-8411 | Siloxane emulsion | Dow Corning | |
| DC-1784 | Siloxane emulsion | Dow Corning | |
| DC-1101 | Siloxane emulsion | Dow Corning | |

TABLE II-continued

| Composition | Source | Properties |
|---|---|---|
| DC-7210 | Siloxane emulsion | Dow Corning |

Ammonium hydroxide (NH$_4$OH), dimethylethanolamine (DMEA), oleic acid and KOH (3000 in H$_2$O) were supplied by Fisher Scientific.

Inventive Coating Compositions 1-8 and Comparative Coating Compositions A-D

Coating compositions were prepared by adding 20 g of dispersion to a speed mixer cup. Emulsion was added at 0, 2 or 5 wt %. 0.08 g of NH$_4$H (ammonium hydroxide) 280% in water was added and mixed at 2000 rpm for 30 seconds. 0.15 g of ACRYSOL ASE-60 (acrylic emulsion copolymer) was added and mixed at 2000 rpm for 30 seconds. The formulation was allowed to sit for 30 minutes before coating. Table III provides the compositional information for the Inventive Coating Compositions and Table IV provides the compositional information for the Comparative Coating Compositions.

TABLE IV-continued

| Coating composition | Comp Ex. A | Comp Ex. B | Comp Ex. C | Comp Ex. D |
|---|---|---|---|---|
| NH$_4$OH (28% in H$_2$O) | 0.4 | 0.4 | 0.4 | 0.4 |
| ACRYSOL ASE-60 | 0.7 | 0.7 | 0.7 | 0.7 |

Coated Fabric Preparation

Lab scale samples: Small samples of airbag fabric comprised of Hyosung 470 Dtex polyester yarn woven into fabric by Global Safety Textiles were cut into 5"×5" squares. Samples were held down on a flat glass clipboard. 3 mL of coating composition was evenly pipetted across the top of the fabric. A size 28 wire round draw down rod from Gardco was used to spread the coating targeting a wet film thickness of 66.7 microns. Samples were then placed in a 150° C. oven for 3 minutes. Upon drying, coat weight was measured by comparing the weight of an uncoated fabric sample versus a coated fabric of the same size.

TABLE V

| Coated Fabric | Inv. Ex. 1 | Inv. Ex. 2 | Inv. Ex. 3 | Inv. Ex. 4 | Inv. Ex. 5 | Inv. Ex. 6 | Inv. Ex. 7 | Inv. Ex. 8 |
|---|---|---|---|---|---|---|---|---|
| Coat Weight, g/m$^2$ | 31 | 32 | 29 | 26.5 | 30 | 31 | 21 | 22 |
| Pressure Retention (measured as % pressure drop @200 kPa for 15 seconds), kPa | <1 | 6 | 3 | 2 | <1 | <1 | <1 | <1 |
| COF (static) | 0.389 | 0.328 | 0.247 | 0.277 | 0.918 | 0.345 | 0.228 | 0.335 |
| COF (dynamic) | 0.33 | 0.218 | 0.184 | 0.23 | 0.721 | 0.261 | 0.143 | 0.182 |

TABLE III

| Coating composition | Inv. Ex. 1 | Inv. Ex. 2 | Inv. Ex. 3 | Inv. Ex. 4 | Inv. Ex. 5 | Inv. Ex. 6 | Inv. Ex. 7 | Inv. Ex. 8 |
|---|---|---|---|---|---|---|---|---|
| Dispersion Ex. 1 | 96.9 | 96.9 | 96.9 | 96.9 | | | | |
| Dispersion Ex. 2 | | | | | | 96.9 | 94.2 | |
| RHOPLEX SG-30 | | | | | 96.9 | | | |
| PRIMAL U-91 | | | | | | | | 96.9 |
| NH$_4$OH (28% in H2O) | 0.4 | 0.4 | 0.4 | 0.4 | 0.4 | 0.4 | 0.4 | 0.4 |
| ACRYSOL ASE-60 | 0.7 | 0.7 | 0.7 | 0.7 | 0.7 | 0.7 | 0.7 | 0.7 |
| DC-1101 | 2 | | | 2 | 4.8 | 2 | | 2 |
| DC 1784 | | 2 | | | | | | |
| DC-8411 | | | 2 | | | | | |
| DC-7210 | | | | 2 | | | | |

TABLE IV

| Coating composition | Comp Ex. A | Comp Ex. B | Comp Ex. C | Comp Ex. D |
|---|---|---|---|---|
| Dispersion Ex. 1 | 98.9 | 98.9 | | |
| Dispersion Ex. 2 | | | | |
| RHOPLEX SG-30 | | | 98.9 | |
| PRIMAL U-91 | | | | 98.9 |

TABLE VI

| Coated Fabric | Comp. Ex. A | Comp. Ex. B | Comp. Ex. C | Comp. Ex. D |
|---|---|---|---|---|
| Coat Weight, g/m$^2$ | 30 | 33 | 25 | 46 |
| Pressure Retention (measured as pressure drop @200 kPa for 15 seconds), kPa | 3 | 15 | <1 | <1 |
| COF (static) | 0.99 | 2.1 | 0.292 | 0.721 |
| COF (dynamic) | 0.87 | 1.7 | 0.245 | 0.527 |

TABLE VII

| Coated Fabric | Comp. Ex. A | Inv. Ex. 1 | Inv. Ex. 2 | Inv. Ex. 3 | Inv. Ex. 4 |
|---|---|---|---|---|---|
| Subset with Scrub Testing, number of scrubs | <25 | 100 | 350 | 50 | 150 |

The coatings of certain inventive coated fabric examples were analyzed with x-ray photoelectron spectroscopy, using the conditions described in below. As can be seen in Tables VIII and IX, the inventive coating compositions self-stratified to form a coating wherein the silicone components are primarily located near the surface of the cured coating. To determine the thickness of the coating, the sample was also measured by PS after sputtering. In addition, the sputtering time vs. thickness was determine by calibrating the sputter rate. After sputtering for 3 hours, a 7 um crater was measured using a line scan with a stylus profilometer. This corresponds to a sputter rate of ~40 nm/min. As Silicon signal was observed higher than bulk at up to 60 seconds, this indicated a potential thickness of 40 nm.

ethylene-based polymer is measured in accordance with ASTM D-1238-04, condition 190° C./21.0 kg. For propylene-based polymers, the melt flow rate (MFR) is measured in accordance with ASTM D-1238-04, condition 230° C./2.16 kg.

Polymer molecular weights are determined by Gel Permeation Chromatography (GPC) as follows. The chromatographic system used is a Polymer Laboratories Model

TABLE VIIIA

| XPS Testing | Inv. Ex. 2 | Inv. Ex. 2 after 30 sec sputter | Inv. Ex. 2 after 60 sec sputter | Inv. Ex. 2 after 1800 sec sputter | Inv. Ex. 5 | Inv. Ex. 5 after 30 sec sputter | Inv. Ex. 5 after 60 sec sputter | Inv. Ex. 5 wait 1 week before coating | Inv. Ex. 7 | Inv. Ex. 7 wait 1 week before coating |
|---|---|---|---|---|---|---|---|---|---|---|
| Carbon (at %) | 58.4 | 93.8 | 97.0 | 92.4 | 63.8 | 96.4 | 98.3 | 65.5 | 52.2 | 52.5 |
| Oxygen (at %) | 24.4 | 3.0 | 1.4 | 6.5 | 22.0 | 2.4 | 1.0 | 20.1 | 26.5 | 26.8 |
| Silicon (at %) | 17.1 | 3.1 | 1.6 | 1.1 | 14.2 | 1.2 | 0.7 | 14.4 | 21.3 | 20.7 |

TABLE VIIIB

| XPS Testing | Inv. Ex. 3 | Inv. Ex. 6 | Inv. Ex. 8 |
|---|---|---|---|
| Carbon (at %) | 61.1 | 62.1 | 60 |
| Oxygen (at %) | 22.3 | 22 | 24.8 |
| Silicon (at %) | 16.6 | 15.9 | 15.3 |

TABLE IX

| No heat applied during coating step | Inv. Ex. 5 | Inv. Ex. 7 |
|---|---|---|
| Carbon (at %) | 77.9 | 53 |
| Stdev | 0.3 | 0.7 |
| Oxygen (at %) | 14.9 | 26.7 |
| Stdev | 0.2 | 0.2 |
| Silicon (at %) | 8.2 | 20.3 |
| Stdev | 0.1 | 0.9 |

Test Methods

Test methods include the following:

Average particle size diameter was measured by a Beckman Coulter LS230 particle size analyzer with a Small Volume Module used as the sample delivery system. The software version utilized is Version 3.29. Hardware and software can be obtained from Beckman Coulter Inc., Miami, Florida.

The analysis conditions for all measurements utilizes a fluid refractive index of 1.332, a sample real refractive index of 1.5, and a sample imaginary refractive index of 0.0. The extended optical model is not employed. The polarization intensity differential scattering (PIDS) option is activated and used to generate the particle size information. The average particle size diameter is measured and reported in μm.

Polymer density is measured in accordance with ASTM D 792.

Melt index ($I_2$) of an ethylene-based polymer is measured in accordance with ASTM D-1238-04, condition 190° C./2.16 kg. Melt index ($I_5$) of an ethylene-based polymer is measured in accordance with ASTM D-1238-04, condition 190° C./5.0 kg. Melt index ($I_{10}$) of an ethylene-based polymer is measured in accordance with ASTM D-1238-04, condition 190° C./10.0 kg. High load melt index ($I_{21}$) of an PL-210. The column and carousel compartments were operated at 145° C. Four Polymer Laboratories 20-um Mixed-A LS columns were used, with a solvent of 1,2,4 Trichlorobenzene (TCB). The samples were prepared at a concentration of 0.1 g of polymer in 50 ml of solvent. The solvent contained 200 ppm of the antioxidant butylated hydroxytoluene (BHT). Samples were prepared by agitating lightly for 1-2 hours at 160° C. The injection volume was 200 microliters and the flow rate was 1.0 ml/min. Calibration of the GPC column set was performed with narrow molecular weight distribution polystyrene standards purchased from Varian Inc. (previously Polymer Laboratories). The polystyrene standard peak molecular weights were converted to polyethylene molecular weights using Williams, T., and I. M. Ward, "The Construction of Polyethylene Calibration Curve for Gel Permeation Chromatography Using Polystyrene Fractions", J. Polym. Sci. Polym. Lett., 6, 631 (1968): $M_{polyethylene}=0.431(M_{polystyrene})$.

Polyethylene equivalent molecular weight calculations are performed using Viscotek TriSEC software Version 3.0.

Dispersion/Emulsion pH is measured using a handheld pH meter from Denver Instruments/Sartorius.

Viscosity was measured with a Brookfield viscometer at 20 rpms.

Unless otherwise specified, acid value is calculated as the mass of potassium hydroxide (KOH) in milligrams that is required to neutralize one gram of component.

Flammability was measured following ISO 3795 and scored based on EASC standard 9904 0180.

Pressure retention was tested using a variation of ASTM d737 and ISO 9237 where only the drop in pressure is measured. The system involves the use of a 10 L pressure tank that can be charged to a targeted pressure of 200 kPa. A 4"×4" sample is cut from the coated fabric sample, and positioned opposite the pressurized tank. The sample is placed overtop a 3.75" diameter gasket that is used to create a seal preventing air from leaking between fabric and the metal plates. The second metal plate is aligned overtop of the lower platen, and the system is clamped. The jig is pressurized with 200 kPa+/−10 kPa of air directed to the non-coated side of the coated fabric. With the coated fabric sample as the only leak point, the pressure drop over the duration of the 30 second test time was monitored. The value at the end of the test time is recorded and compared to the starting pressure. A Swagelok CF-3M valve is opened to allow pressure to be applied to the coated fabric and a ROSE- MOUNT™ 3051 Pressure Transmitter with HART® Protocol is used to record the pressure. The pressure information is captured via LabView software.

Cured coat weight was measured by comparing the weight of an uncoated fabric sample vs a coated fabric of the same size. Wet coat weight can be measured the same way, or through spectroscopic or optical interference techniques such as rugged optical interference (ROI) instruments from Specmetrix.

Coefficient of friction, static and dynamic, (COF) were measured according to ISO 8295.

A scrub test based on ISO 5981 was used to test the coated materials for adhesion of the rubber to the fabric. According to this test, a coated fabric sample is given repeated flexes under a specified force using a scrub testing machine meeting the ISO 5981 standard. The surface of the coated fabric was examined after a specified number of scrubs for signs of delamination, such as flaking or pinholes. Test failure was determined by the evidence of pinholes seen through the coating when observed on a light box. The number of scrubs prior to failure is reported for the examples. A higher number indicated better adhesion of the silicone to the substrate.

X-ray photoelectron spectroscopy (XPS) was performed under the following conditions:
Surface XPS:
  Data was collected on a PHI VersaProbe II microprobe XPS instrument.
  Pass Energy: 23.5 eV
  Step Energy: 0.1 eV/step
A sufficient number of scans was collected to provide sufficient signal-to-noise.
GCIB Depth Profiles:
Pass Energy 23.5 eV
  Sputter cycle time: 30 seconds×10 cycles, 60 seconds×25 cycles
  Sputter conditions: $Ar_{2500}^+$ @ 20 kV set to 20 nanoAmp (nA) of target current over a 2×2 mm raster
  Results are reported as atomic % (at %).
To calibrate thickness of silicone coating, the sample was sputtered with a 10 kV $Ar_{2500}^+$ ion beam with a beam current of 20 nA, rastered over 2×2 mm. After sputtering, the crater was measured using a line scan with stylus profilometer.

Surface free energy of polymers is measured according to the method described in "Estimation of the Surface Free Energy of Polymers" Journal of applied polymer science, vol 13. P 1741 (1969), said method calculating surface energy from contact angles with water and methyl iodide.

The present invention may be embodied in other forms without departing from the spirit and the essential attributes thereof, and, accordingly, reference should be made to the appended claims, rather than to the foregoing specification, as indicating the scope of the invention.

What is claimed is:

1. A coating composition comprising:
    (1) a first polymeric component which comprises a first polymeric dispersion, wherein first polymers contained in the first polymeric dispersion have a surface free energy of equal to or greater than 28 $mJ/m^2$ and a volume average particle size diameter of from 0.1 to 10 microns;
    (2) a second polymeric component which comprises one or more second polymeric emulsions wherein second polymers contained in the second polymeric emulsions have a surface free energy equal to or less than 26 $mJ/m^2$ and a volume average particle size diameter from 0.005 to 1,000 microns;
    (3) one or more rheology modifiers such that the coating composition has a viscosity of from 100 to 2000 cPs; and
    (4) optionally, base to stabilize the first and second polymeric components;
    wherein the first polymeric component is present in an amount such that the solids in the first polymeric component are from 50 to 99.9 wt % of a total solids content of the coating composition;
    wherein the second polymeric component is present in an amount such that the solids in the second polymeric component are from 0.1 to 50 wt % of a total solids content of the coating composition; and
    wherein the coating composition comprises from 50 to 99.9 wt % of the first polymeric dispersion and from 0.1 to 50 wt % of the second polymeric emulsion.

2. The coating composition of claim 1, wherein the first polymeric component comprises a dispersion which is the melt blended product of:
    a) from 50 to 95 wt %, based on the total solids weight of the dispersion, of one or more olefinic base polymers, wherein the one or more olefinic base polymers exhibit a surface free energy of equal to or greater than 28 $mJ/m^2$, a density from 0.86 to 0.96 g/cc and a melt index, 12, from 1 to 50 g/10 minutes;
    (b) from 2 to 40 wt %, based on the total solids weight of the dispersion, of one or more dispersants;
    (c) from 0 to 15 wt %, based on the total solids weight of the dispersion, of one or more compatibilizers;
    (d) water; and
    (e) base to neutralize the one or more dispersants from 100 to 140% of an acid value of the one or more dispersants;
    wherein the dispersion exhibits a volume mean particle size of equal to or less than 1 micron, a solids content of from 1 to 60 wt %.

3. The coating composition of claim 1, wherein the first polymeric component comprises a dispersion comprising from 90 to 99 wt % one or more polyurethanes and from 0.2 to 2 wt % acrylic rheology modifier, based on the total solids weight.

4. The coating composition of claim 1, wherein the second polymeric component comprises an organopolysiloxane emulsion which comprises one or more organopolysiloxane polymers having a weight average molecular weight from 1,000 to 1,000,000, one or more surfactants, and water, wherein the organopolysiloxane emulsion has an internal phase viscosity from 50 to 30,000,000 cPs, a pH from 4 to 9 and a volume average particle size diameter from 0.005 to 1000 microns, and comprises from 1 to 98 wt % organopolysiloxane polymer(s).

5. The coating composition of claim 1, wherein the second polymeric component has a volume average particle size diameter from 0.01 to 100 micrometers.

6. The coating composition of claim 1, wherein the second polymeric component comprises a functionalized organopolysiloxane having one or more functionalities selected from the group consisting of amino, hydroxyl, acrylate, alkoxy, alkyl, aryl/phenyl, carboxy, polyether/polyglycol, and epoxy functionalities.

7. The coating composition of claim 4, wherein the organopolysiloxanes emulsion comprises from 40 to 90 wt % silicone.

8. The coating composition of claim 1, wherein the first polymeric dispersion has a volume average particle size diameter of from 0.1 to 1 microns.

* * * * *